July 7, 1953     M. E. FRANCISCO     2,644,569

PITTING AND STUFFING APPARATUS CONVEYER

Filed Jan. 8, 1951

MARSHALL E. FRANCISCO
INVENTOR
HUEBNER, BEEHLER,
WORREL & HERZIG
ATTORNEYS

BY Richard M. Worrel

Patented July 7, 1953

2,644,569

UNITED STATES PATENT OFFICE 2,644,569

PITTING AND STUFFING APPARATUS CONVEYER

Marshall E. Francisco, San Jose, Calif.

Application January 8, 1951, Serial No. 204,970

6 Claims. (Cl. 198—33)

The present invention relates to conveyors and more particularly to a conveyor adapted to meter and align in predetermined attitude oblong articles received in bulk concurrently with their movement to new positions.

This application is a division of my copending application for United States Letters Patent Serial No. 111,060, filed August 6, 1949, entitled "Pitting and Stuffing Apparatus."

In the mechanical pitting and/or stuffing of fruit such as olives, cherries, and the like, it is important that the fruit be accurately orientated in relation to the pitting and stuffing mechanisms. For example, it is important in the pitting of such fruits that the pits be ejected either through the stem ends thereof or through the diametrically opposite ends. The ejection of the pits through the sides of the fruit results in excessively large ejection openings and substantial impairing of the resultant appearance of the fruit. Further, fruit pits are normally elongated longitudinally of the fruit and are much more easily ejected longitudinally than transversely.

In the pitting and stuffing of fruits it has been found desirable to orientate the fruit with the stem end downwardly disposed in an attitude in substantially right angular relation to the horizontal position preferred. Further, such positioning of the fruit in vertically disposed positions has not been as consistently accurate as desired with the result that unnecessarily large quantities of the pitted and/or stuffed fruit results in culls.

An object of the present invention is to provide an improved metering and conveying system for oblong fruit and the like adapted to handle a continuous supply delivered into a hopper, to convey the same in timed spaced relation from the hopper, and to position the fruit in predetermined attitude during such conveyance.

Further objects are to provide improved elements and arrangements thereof in a device of the character and for the purposes set forth that are simple in structure, dependable in operation, and economical to employ.

Further objects and advantages will become apparent in the subsequent description in the specification.

Figure 1:
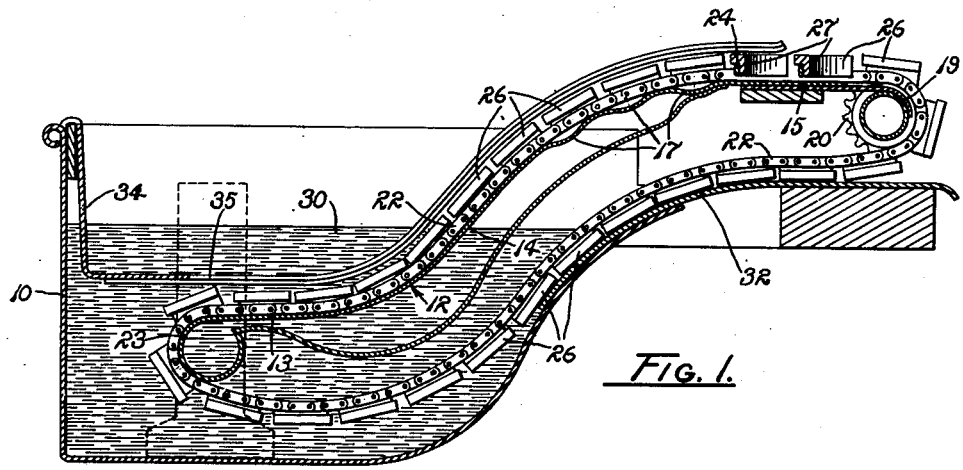
Fig. 1 is a fragmentary vertical longitudinal section of a fruit pitting and stuffing machine employing a fruit metering and aligning conveyer embodying the principles of the present invention.

Referring in greater detail to the drawings:

A bin or hopper 10 is adapted to receive olives or other fruit to be metered, aligned, and conveyed is indicated generally at 10. The hopper is preferably water-tight so that liquid may be contained therein to make fruit received thereby relatively buoyant and easy to gather and convey therefrom, as will subsequently become more clearly apparent.

The conveyor employs a pathway 12 of sheet material or the like, having a lower end portion 13 within the hopper 10 which is substantially horizontal, an upwardly inclined central portion 14, and a substantially horizontal upper end portion 15 extended from the hopper. Transverse corrugations 17 are provided in the pathway in the central and upper portions 14 and 15. The corrugations are in right angular relation to the inclined pathway 12 and thus are individually substantially horizontal.

An axle 19 is rotatably mounted adjacent and below the upper end 15 of the pathway 12 in transverse relation thereto. A pair of spaced sprockets 20 are mounted on the axle adjacent to the upper end of the pathway in substantial alignment therewith. The pathway is substantially tangentially related to the sprockets. The axle 19 is rotated continuously or in stepped progression, as desired, by a motivating means, not shown.

A pair of horizontally spaced, substantially parallel chains 22 are individually mounted about the sprockets for travel longitudinally of the pathway 12. At the lower end of the pathway a substantially cylindrical member 23 is formed integrally with the pathway transversely thereof and slidably receives the chains for circuitous travel thereabout. It will be obvious that sprockets could be employed in place of the cylindrical member but such sprockets have been found objectionable within the hopper because of their fruit damaging effect. The chains 22 are sufficiently loose gravitationally to conform to the curved upper surfaces of the pathway 12, as clearly evident in Fig. 1.

Figure 2:
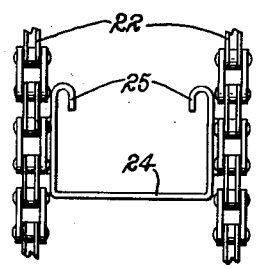
Fig. 2 is a fragmentary plan view of the conveyer shown in Fig. 1 having a fruit engaging element thereof removed for illustrative convenience.
Figure 4:
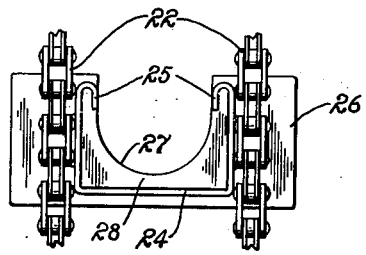
Fig. 4 is a view looking upwardly of the conveyer fragmentarily showing the same and demonstrating the association of the fruit engaging element of Fig. 3 in portions of the conveyer shown in Fig. 2.
Figure 3:
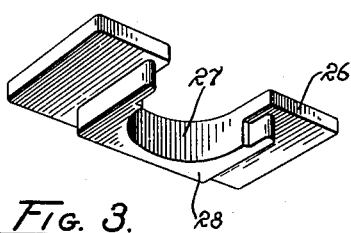
Fig. 3 is a perspective view of a fruit engaging element which is adapted to be releasably mounted in the structure shown in Fig. 2.

As shown in Fig. 2, generally U-shaped clips 24, of spring material and having reversely turned legs 25, are mounted between the chains 22 for travel therewith over the pathway 12. A plurality of fruit engaging and motivating cups 26 are mounted for travel with the chains by insertion into the clips. The cups are preferably substantially rectangular and have a concave fruit engaging edge 27. The cups have no bottoms, for it is desired to roll the fruit over the pathway but do have a downwardly extended base 28 adapted releasably to be grasped by the clips for retention in the conveyor. The cups are conveniently formed from plastic, ceramic or other strong and readily cleaned material. The base portions of the cups are held by the reversely turned legs 25 of the clips but may readily be removed therefrom for replacement by cups of other sizes or shapes in relation to the size and shape of fruit to be carried by the cups by springing the clips. When the cups are located in the clips, the clips resiliently grasp the bases 28 thereof for releasable retention between the chains 22.

The hopper is filled with water or other liquid having a buoying effect on the fruit as indicated at 30.

A drip pan 32 is mounted in the hopper 10 below the pathway 12 and extended from the bin under the pathway to a position beneath the upper end 15 of the pathway.

A fruit guide 34 having an elongated slot 35 is mounted in the hopper 10 and serves to funnel fruit deposited therein onto the cups 28. The slot 35 is positioned in vertical alignment with the conveyor.

Operation

The operation of the device of the present invention is clearly apparent and is briefly reviewed at this point. Cups 26 adapted to receive in association with the pathway 12 individual fruit of the type desired to be metered and aligned are mounted in the clips 24 on the chains 22. Fruit suitable for use in the selected cups is deposited in the hopper 10. The hopper is also filled with a liquid that imparts buoyancy to the fruit. The axle 19 is rotated to cause the chains 22 and the cups 25 borne thereby to travel upwardly over the pathway 12 including the corrugations 17 to the upper end 15 of the pathway. As the chains and cups are dragged upwardly over the pathway, individual fruit in the hopper settles into the cups and is rolled upwardly over the pathway. By employing cups of appropriate fruit size and providing an abundance of fruit in the hopper the loading of each cup is assured and inasmuch as there is room for only one fruit in each cup the fruit is conveyed individually in succession up the pathway, excessive fruit buoyed by the water being shed from the pathway. The shedding of excess fruit is facilitated by the provision of the relatively precipitously inclined central portion 14 and the water or other buoyant liquid in the hopper 10.

Oblong fruit such as olives, dates, and the like, as they are rolled across the corrugations 17, automatically position themselves with their larger axes transversely of the pathway 12. Thus fruit is conveyed from the bin 55 in timed spaced relation dependent upon speed of chain travel, and positioned at the upper end 15 of the pathway for subsequent handling.

From the upper end of the pathway 12 the aligned fruit is successively transferred for pitting, stuffing or other purposes, as for example, by the mechanical hand shown and described in my copending patent application to which reference has already been made.

The conveyor handles a continuous or intermittent flow of fruit in bulk delivered to the hopper 10, and meters and aligns the fruit as it is conveyed therefrom. The device is simple in character, dependable in operation, and economical to employ.

Although I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent constructions.

Having described my invention, what I claim as new and desire to secure by Letters Patent is:

1. An apparatus for metering and orientating rollable oblong articles comprising a hopper adapted to receive rollable articles in bulk, a fluid bath in the hopper adapted to buoy articles deposited therein, an inclined pathway extending upwardly from the hopper, said pathway having a substantially horizontal portion within the hopper, a central inclined portion, and a substantially horizontal upper end portion, said upper end portion having corrugations extending transversely thereof in substantially 90° angular relation to the length of the pathway and the pathway having arcuate transitional concave and convex portions between the relatively horizontal and more inclined portions of the pathway, an endless chain mounted for circuitous travel longitudinally of the pathway and having a portion arranged for travel upwardly of the pathway, said chain being mounted with sufficient slack gravitationally to conform to the relatively horizontal and more inclined portions of the pathway, and a plurality of fruit motivating members releasably mounted by the chain for travel therewith over the pathway, said members having concave edges forwardly disposed relative to their direction of travel and in association with the pathway forming individual fruit compartments.

2. In an apparatus for conveying and aligning oblong rollable articles, a hopper adapted to receive the rollable articles in bulk; a fluid bath in the hopper adapted to buoy articles deposited therein; a pathway having a relatively horizontal lower end portion immersed in the bath, an upwardly inclined central portion extended from the bath, and a relatively horizontal upper end portion, the upper end portion having a plurality of transverse corrugations formed therein in substantially right angular relation to the pathway; a pair of endless chains mounted in parallel relation for circuitous travel longitudinally of the pathway and having a portion arranged for travel upwardly thereof, the chain being mounted with sufficient slack gravitationally to conform to the relatively horizontal and more inclined portions thereof; U-shaped clips of spring material interconnecting the chains for travel therewith over the pathway and having inwardly turned hooked ends extended upwardly of the pathway; and a plurality of motivating cups having concave edges upwardly disposed to the pathway and bases in releasable engagement with the clips and hooked ends thereof.

3. In an apparatus for metering and orientating rollable oblong articles, the combination of an elongated path having transverse corrugations in substantially right angular relation to the length of the pathway; a plurality of article motivating cups having concave edges, and means for motivating the cups longitudinally of the pathway with the concave edges thereof forwardly disposed relatively to the direction of movement over the pathway and symmetrically related to the transverse corrugations thereof.

4. In an apparatus for metering and orientating rollable oblong articles, the combination of means for receiving a supply of the articles; an elongated pathway having a substantially horizontal lower end portion within the article receiving means, a central portion upwardly inclined from the horizontal portion, and a substantially horizontal upper end portion, the portion having an arcuate concave portion transitionally interconnecting the lower end portion of the central portion and a convex arcuate portion transitionally interconnecting the central portion and the upper end portion, said upper end portion having corrugations transversely thereof in substantially right angular relation to the length of the pathway; an endless chain mounted for circuitous travel lengthwise of the pathway and having a portion arranged for travel upwardly of the pathway, said chain being mounted with sufficient slack gravitationally to conform to the relatively horizontal and more inclined portions of the pathway as well as the arcuate transitional portions substantially coextensive with the length of the pathway; and motivating cups borne by the chain adapted to receive the oblong articles therein for travel upwardly of the pathway in rolling engagement therewith.

5. In an apparatus for conveying and orientating oblong rollable articles, a hopper adapted to receive the rollable articles in bulk; a pathway having an end within the hopper upwardly inclined therefrom and providing transverse corrugations formed therein in substantially right angular relation to the pathway; a pair of endless chains mounted in parallel relation for circuitous travel longitudinally of the pathway and having a portion arranged for travel upwardly thereof; and a plurality of motivating cups having concave edges mounted between the chains for travel therewith over the pathway with the concave edges disposed upwardly of the pathway.

6. In an apparatus for conveying and orientating rollable oblong articles, a hopper adapted to receive the rollable articles in bulk; an elongated pathway having a lower end portion disposed within the hopper and being upwardly inclined therefrom and providing transverse corrugations therein in substantially right angular relation to the length of the pathway; a pair of endless chains mounted in parallel relation for circuitous travel longitudinally of the pathway and having a portion arranged for travel upwardly thereof; U-shaped clips of spring material interconnecting the chains for travel therewith over the pathway and having inwardly turned hooked ends extended upwardly of the pathway; and a plurality of motivating cups having concave edges upwardly disposed to the pathway and bases in releasable engagement with the clips and hooked ends thereof.

MARSHALL E. FRANCISCO.

References Cited in the file of this patent

UNITED STATES PATENTS

| Number | Name | Date |
| --- | --- | --- |
| 2,190,970 | Ashlock | Feb. 20, 1940 |
| 2,298,614 | Carroll | Oct. 13, 1942 |
| 2,426,398 | Lathrop | Aug. 26, 1947 |
| 2,451,528 | Armstrong | Oct. 19, 1948 |